United States Patent
Van Dijk et al.

(10) Patent No.: US 11,833,765 B2
(45) Date of Patent: Dec. 5, 2023

(54) METHOD OF PRODUCING AN ARTICLE COMPRISING A RUBBER-LIKE FILM-BASED ARTICLE FIRMLY FIXED TO A SUBSTRATE

(71) Applicant: CARIFLEX PTE. LTD., Singapore (SG)

(72) Inventors: Nikolaas Van Dijk, Houten (NL); Thorsten Gurke, Ruppichteroth (DE); Philippe Henderson, Marbais (BE)

(73) Assignee: CARIFLEX PTE. LTD., Singarpore (SG)

( * ) Notice: Subject to any disclaimer, the term of this patent is extended or adjusted under 35 U.S.C. 154(b) by 169 days.

(21) Appl. No.: 17/376,329

(22) Filed: Jul. 15, 2021

(65) Prior Publication Data
US 2022/0024150 A1    Jan. 27, 2022

(30) Foreign Application Priority Data
Jul. 27, 2020    (EP) ..................................... 20187815

(51) Int. Cl.
| | |
|---|---|
| B29C 41/20 | (2006.01) |
| B29C 65/00 | (2006.01) |
| B29C 41/14 | (2006.01) |
| B29C 41/46 | (2006.01) |
| B29C 65/02 | (2006.01) |
| A41D 13/12 | (2006.01) |
| A41D 19/00 | (2006.01) |
| B29C 41/42 | (2006.01) |
| B29K 9/06 | (2006.01) |

(52) U.S. Cl.
CPC .......... *B29C 66/7485* (2013.01); *B29C 41/14* (2013.01); *B29C 41/20* (2013.01); *B29C 41/46* (2013.01); *B29C 65/02* (2013.01); *A41D 13/1209* (2013.01); *A41D 19/0055* (2013.01); *A41D 2500/54* (2013.01); *B29C 41/42* (2013.01); *B29K 2009/06* (2013.01)

(58) Field of Classification Search
None
See application file for complete search history.

(56) References Cited

U.S. PATENT DOCUMENTS

| | | | | |
|---|---|---|---|---|
| 4,367,312 A | * | 1/1983 | Bontinck | ................ C08L 23/06 525/212 |
| 2015/0104663 A1 | * | 4/2015 | De Jong | ................ C08K 5/524 524/331 |

FOREIGN PATENT DOCUMENTS

| | | |
|---|---|---|
| EP | 3055355 B1 | 8/2016 |
| EP | 3520750 A1 | 8/2019 |
| WO | 2015/119873 A1 | 8/2015 |

OTHER PUBLICATIONS

European Search Report for EP 20187815.4 dated Dec. 17, 2020.

* cited by examiner

*Primary Examiner* — Mohammad M Ameen
(74) *Attorney, Agent, or Firm* — United One Law Group LLC; Kongsik Kim; Jhongwoo Peck

(57) ABSTRACT

The present invention relates to a method including a rubber-like film-based article of which at least a portion is firmly fixed to a substrate. The method includes providing a film-based article made of a non-crosslinked thermoplastic rubber, contacting at least a portion of the film-based article with a substrate so as to form a contact area between the film-based article and the substrate, and heat sealing at least a portion of the contact area at a temperature of 190 to 250° C. for at least 1 second.

10 Claims, No Drawings

METHOD OF PRODUCING AN ARTICLE COMPRISING A RUBBER-LIKE FILM-BASED ARTICLE FIRMLY FIXED TO A SUBSTRATE

CROSS-REFERENCE TO RELATED APPLICATION

This application claims priority to European Patent Application No. 20187815.4 filed on Jul. 27, 2020. The aforementioned application is incorporated herein by reference in its entirety.

TECHNICAL FIELD

The present invention relates to a method of producing an article comprising a rubber-like film-based article of which at least a portion is firmly fixed to a substrate.

BACKGROUND

Rubber-like film-based articles have to be firmly fixed to a substrate in a plurality of applications. In some applications, the substrate is also made of a rubber or rubber-like material and even of the same rubber or rubber-like material as the rubber-like film-based article. Thus, in these applications two or more rubber films may be adhered which each other to form a multilayer structure. Alternatively, different components of an article are adhered to each other to form the final article having a complex design, wherein some or all of the components are made of a rubber or rubber-like material. In other applications, the substrate is made of a non-rubber material, such as of polyurethane, polyethylene terephthalate, nylon, polyethylene or the like. For example, certain balloon catheters comprise a balloon as film-based article made of rubber or rubber-like material, wherein the balloon is fixed to a tube as substrate made for instance of polyurethane. In other applications a surgical glove as film-based article made of rubber is adhered to a sleeve as substrate made of polyethylene or to a fabric substrate, such as the arm component of a surgical coat. Other examples are rubbery breathable films for wound dressing, rubber-like seals for protective suits, shoes with rubber soles, clothes with rubber parts and the like.

Usually, rubber film-based articles, i.e. articles made of one or more films made of vulcanized or crosslinked rubber, respectively, are fixed to a substrate made of rubber, of a rubber-like material, of a non-rubber polymeric material or of a fabric, by means of a glue or adhesive, respectively. However, this is connected with several disadvantages. Firstly, the seal strength of glue bonds is in a plurality of cases not sufficient or the seal strength is initially acceptable, but reduces over the time to an inacceptable value, thus limiting the service life of these articles. Moreover, glues are mostly not heat-resistant, but softens with increasing temperature, which also limits the service life of these articles. In addition, the peel strength as well as impact resistance of a glue bond is typically quite low. Furthermore, reproducible fixing two complex shaped components to each other with a glue is a challenge.

SUMMARY

In view of the above, the object underlying the present invention is to provide a method of producing an article comprising a rubber-like film-based article of which at least a portion is firmly fixed to a substrate, which does not need the use of a glue, adhesive or the like, but which nevertheless leads to an article, in which the rubber-like film-based article is firmly and permanently fixed to a substrate.

In accordance with the present invention, this object is satisfied by providing a method of producing an article comprising a rubber-like film-based article of which at least a portion is firmly fixed to a substrate, comprising the following steps:
 a) providing a film-based article made of a non-crosslinked thermoplastic rubber,
 b) contacting at least a portion of the film-based article with a substrate so as to form a contact area between the film-based article and the substrate and
 c) heat sealing at least a portion of the contact area at a temperature of 190 to 250° C. for at least 1 second.

By using a non-crosslinked thermoplastic rubber film-based article, the film-based article may be heat sealed with the substrate, which is not possible, if a vulcanized, i.e. crosslinked, rubber is used. Heat sealing leads to a firm and in particular permanently firm bond between the substrate and the film-based article. In particular, when the non-crosslinked thermoplastic rubber film-based article is heat sealed with a substrate made of the same or a different non-crosslinked thermoplastic rubber, excellently high seal strengths are obtained. Therefore, the use of a glue is not at all necessary and the aforementioned disadvantages connected with the use of a glue are avoided in the method in accordance with the present invention. However, if appropriately selecting the non-crosslinked thermoplastic rubber material, a film-based articles with rubber-like mechanical properties required for the application, such as an appropriate tensile strength, appropriate elasticity, appropriate modulus, appropriate puncture resistance and the like, i.e. being concerning the properties equivalent to vulcanized rubber film-based articles may be produced and used in the article.

DETAILED DESCRIPTION

The term "non-crosslinked thermoplastic rubber" means in accordance with the present invention any thermoplastic elastomer, i.e. any copolymer having thermoplastic as well as elastomeric properties.

"Copolymer" means in accordance with the present invention any polymer comprising more than one monomer, i.e. biopolymers, terpolymers, quarter polymers and more monomers comprising polymers.

"Film-based article" denotes in accordance with the present invention any article, which is made of one or more films having a thickness of at most 20 mm, such as gloves, catheter balloons, shoe soles or the like. Thus, the term "film-based article" also covers a film or, in other words, a film is considered in the present patent application to be a film-based article.

In step a) a film-based article made of a non-crosslinked thermoplastic rubber is provided. The film-based article made of a non-crosslinked thermoplastic rubber is an article comprising at least 50% by weight, preferably at least 75% by weight, more preferably at least 90% by weight, even more preferably at least 95% by weight and still more preferably at least 98% by weight. Most preferably, the film-based article made of a non-crosslinked thermoplastic rubber completely consists of a respective rubber.

Preferably, the non-crosslinked thermoplastic rubber used in step a) of the method in accordance with the present invention is a thermoplastic styrenic block copolymer. Thermoplastic styrenic block copolymers allow to produce film-based articles with suitable rubber-like mechanical properties, such as an appropriate tensile strength, elasticity, modulus and puncture resistance.

Examples for suitable thermoplastic styrenic block copolymers are those being selected from the group consisting of styrene-isoprene-styrene block copolymers (SIS), styrene-isobutylene-styrene block copolymers (SIBS), styrene-butadiene-styrene block copolymers (SBS), styrene-ethylene-butylene-styrene block copolymers (SEBS), styrene-ethylene-propylene-styrene block copolymers (SEPS), styrene-ethylene-ethylene-propylene-styrene block copolymers (SEEPS) and arbitrary combinations of two or more of the aforementioned thermoplastic styrenic block copolymers.

Good results are in particular obtained, when the thermoplastic styrenic block copolymer is a styrene-isoprene-styrene block copolymer (SIS).

In accordance with a particular preferred embodiment of the present invention, the non-crosslinked thermoplastic rubber used in step a) of the method in accordance with the present invention is a branched block copolymer of the general formula (I):

A-B—Y—(B-A)$_n$    (I), wherein each A is independently a polymer block composed of at least 80 mol. % of an alkenyl aromatic hydrocarbon, the content of A by weight of the total weight of the polymer is in the range of 5 to 20%, Y is the remnant of a coupling agent having a functionality greater than 2, the degree of branching is n+1, wherein n is an integer from 2 to 4, each B is independently an olefinically unsaturated polymer block composed of at least 80 mol. % of one or more conjugated dienes and the block copolymer has a coupling efficiency in the range of 70 to 100%.

Films made of this material do not only have suitable mechanical properties, such as an excellent tensile strength and elasticity, but are also heat sealable leading to a heat sealed article having a very high sealing strength.

Good results are in particular obtained, when each A block independently has a weight average molecular weight ranging from 10,000 to 12,000 g/mol and/or each B Block independently has a weight average molecular weight ranging from 80,000 to 120,000 g/mol. In accordance with the present invention the molecular weights are determined pursuant to ASTM 3536 using mono-dispersed polystyrene standards.

In a further development of the idea of the present invention it is proposed that the non-crosslinked thermoplastic rubber used in step a) is a branched block copolymer of the general formula (I), wherein each A is independently a polymer block composed of at least 90 mol. % of an alkenyl aromatic hydrocarbon, the content of A by weight of the total weight of the polymer is in the range of 9 to 12%, each B is independently an olefinically unsaturated polymer block composed of at least 90 mol. % of one or more conjugated dienes and the block copolymer has a coupling efficiency in the range of 84 to 100%.

Even more preferably, the degree of branching is 4 and the coupling efficiency is 90 to 100%.

In a further development of the idea of the present invention, the non-crosslinked thermoplastic rubber used in step a) of the method in accordance with the present invention is a branched block copolymer of the general formula (I), in which each B is a polymer block composed of at least 90 mol. % of isoprene and each A is a polymer block composed of at least 90 mol. % of styrene. In this embodiment, the non-crosslinked thermoplastic rubber used in step a) is a branched SIS.

Thus, most preferably the non-crosslinked thermoplastic rubber used in step a) of the method in accordance with the present invention is a branched block copolymer of the general formula (I), wherein each A is independently a polymer block composed of at least 90 mol. % of styrene, the content of A by weight of the total weight of the polymer is in the range of 9 to 12%, Y is the remnant of a coupling agent having a functionality greater than 2, the degree of branching is n+1, wherein n is an integer from 2 to 4, each B is independently an olefinically unsaturated polymer block composed of at least 90 mol. % of isoprene, the block copolymer has a coupling efficiency in the range of 84 to 100%, each A block independently has a weight average molecular weight ranging from 10,000 to 12,000 g/mol and each B Block independently has a weight average molecular weight ranging from 80,000 to 120,000 g/mol.

The present invention is not particularly limited concerning the thickness of the film, from which the film-based article provided in step a) is made, as long as the film has sufficiently good mechanical properties and the film is not too thick that a heat sealing cannot be practiced anymore. For example, the film of the film-based article provided in step a) may have a thickness of 1 μm to 10 mm, preferably of 10 μm to 1 mm, more preferably of 50 μm to 500 μm and most preferably of 150 μm to 250 μm.

Concerning the method for preparing the film-based article provided in step a), the present invention is not particularly limited. An example for an easy and cost-efficient method for producing the film-based article provided in step a), which even allows to prepare film-based articles with a complex form with a minimum dimensional tolerance, is coagulation dipping using a latex of the non-crosslinked thermoplastic rubber. Coagulation dipping bases on the formation of a polymer film by dipping a mold with a surface profile complying to that of the film to be formed first into a coagulation agent, so as to bind coagulation agent onto the surface of the mold, before the so treated mold is dipped into rubber latex. On account of the coagulation agent on the surface of the mold, the rubber contained in the latex coagulates and precipitates on the surface of the mold leading to a film-based article in the form of the surface profile of the mold. As set out above, in the present invention specifically latex of non-crosslinked thermoplastic rubber is used so that the term "latex" means a dispersion of the particles of non-crosslinked thermoplastic rubber in a medium, preferably in an aqueous medium.

More specifically, the coagulation dipping may comprise the following steps:
  i) dipping a mold into a coagulant solution,
  ii) removing the mold from the coagulant solution and drying the mold,
  iii) dipping the dried mold into a latex of the non-crosslinked thermoplastic rubber so as to form a film-based article made of a non-crosslinked thermoplastic rubber on the mold,
  iv) removing the mold with the film-based article thereon from the latex and pre-curing the film, v) optionally leaching the film-based article in water,
vi) curing the film-based article and
vii) removing the film-based article from the mold.

Usually, the mold will be cleaned and dried in an oven e.g. at about 100° C., before it is used in step i).

Preferably, the coagulant solution is an aqueous solution containing one or more different alkaline earth metal salts. Good results are in particular obtained with aqueous solutions containing a calcium salt, which has a sufficiently high solubility in water, such as calcium chloride or calcium nitrate. The content of the alkaline earth metal salt(s) in the aqueous solution may be between 5 and 40% by weight, such as 10 to 20% by weight, such as about 15% by weight. A dipping time of 15 to 60 seconds and preferably 25 to 40 seconds is usually enough to bind a sufficient amount of the coagulation agent onto the surface of the mold.

The mold removed in step ii) from the coagulant solution may be dried in an oven at a temperature between 90 to 110° C., before it is dipped in step iii) into a latex of the non-crosslinked thermoplastic rubber so as to form a film-based article made of a non-crosslinked thermoplastic rubber on the mold. The latex is preferably an aqueous dispersion of the non-crosslinked thermoplastic rubber in water, wherein the latex has preferably a concentration of the non-crosslinked thermoplastic rubber of 50 to 80% by weight, more preferably of 60 to 70% by weight and most preferably of 63 to 67% by weight. In order to obtain a particular homogeneous distribution of the non-crosslinked thermoplastic rubber particles in the latex, it is suggested that the latex contains small amounts of a surfactant, preferably of an anionic surfactant, such as a rosin acid salt. The latex used step iii) may be a latex being diluted to a concentration of the non-crosslinked thermoplastic rubber of 30 to 35% by weight.

The latex may be prepared by a method comprising the following steps:
 a) emulsifying a solution of the non-crosslinked thermoplastic rubber with soap in a high shear mixer,
 b) removing the solvent of the so formed emulsion,
 c) adjusting the solid content of the so obtained solvent free emulsion and
 d) pasteurizing the so obtained latex.

The mold with the film-based article thereon as removed from the latex is precured in step iv) preferably at a temperature between 90 to 110° C. for 30 to 60 seconds and preferably at a temperature between 95 to 105° C. for 50 to 70 seconds, such as about 30 or about 60 seconds.

After having removed the film-based article in step v) from the mold, after the optional leaching of the film-based article in water, preferably in hot water (such as in water having a temperature of 40 to 60° C. for 1 to 10 minutes, such as in water having a temperature of about 50° C. for about 5 minutes), in step vi) so as to remove remaining chemicals, such as surfactant, from the film-based article, the film-based article is finally cured in step vii). Good results are in particular obtained, when the curing is performed for 10 to 30 minutes at 80 to 150° C. and more preferably for 15 to 25 minutes at 100 to 120° C.

Concerning the substrate, the present invention is not particularly limited, as long as the substrate is able to be heat sealed with the film-based article. For example, the substrate may be made of a material being selected from the group consisting of non-crosslinked thermoplastic rubbers, polyamides, polyesters, thermoplastic polyurethanes and arbitrary combinations of two or more of the aforementioned materials.

Best results in view of the obtained seal strength are achieved, when the substrate is made—as the film-based article, to which it is fixed by heat sealing—from a non-crosslinked thermoplastic rubber and most preferably from the same non-crosslinked thermoplastic rubber as the film-based article. In particular, the substrate may a film-based article and even the same film-based article, so that in this embodiment two same film-based articles may be fixed with each other by means of heat sealing. In that case seal strengths of more than 20 N/25 mm may be obtained. In this embodiment, articles with a multilayer structure may be produced by heat sealing two or more films or formed film-based articles made of the same or at least very similar material onto each other. Alternatively, this embodiment may be used to produce very complex formed articles by heat sealing components of the final structure to each other.

The substrate may be in another embodiment a fabric, such as a fabric made of wool or of a thermoplastic polymer. The porous surface structure of such a fabric supports the heat sealing.

In accordance with the present invention, the heat sealing is performed in step c) at a temperature of 190 to 250° C. for at least 1 second. Preferably, the heat sealing is performed in this temperature range for at least 5 seconds, more preferably for at least 10 seconds, still more preferably for at least 20 seconds, even more preferably for at least 30 seconds and most more preferably for at least 50 seconds, such as for about 60 seconds. The upper limit for the heat sealing time is not particularly limited and may be 240 seconds, 180 seconds or 120 seconds.

In accordance with a particular preferred embodiment of the present invention, in particular when using a film-based article made of a block copolymer of the general formula (I), the heat sealing is performed in step c) at a temperature of 190 to 230° C., more preferably at a temperature of 190 to 220° C., even more preferably at a temperature of 195 to 210° C., such as at about 200° C.

Moreover, it is preferred that the heat sealing is performed in step c) at ambient pressure or under slight over-ambient pressure.

The heat sealing may be performed with any commercially available heat sealing devise, such as those using a heat sealing bar. This allows that that the pressure and temperature during the heat sealing is the same or at least essentially the same over the heat sealed contact area.

In most applications, the heat sealing with be performed in step c) along a line on the contact area formed in step b) between the film-based article and the substrate. However, it is also possible to heat seal the film-based article with the substrate along two or more lines, which may be all in the border area of the film-based article and/or substrate. Typically, the width of the heat sealed portion will be 3 to 5 mm.

As set out above, depending on the materials of the film of the film-based article and of the substrate, very high seal strength may be obtained. Thus, preferably the seal strength of the heat sealed contact area between the film-based article and the substrate is at least 5 N/25 mm, more preferably at least 5 N/25 mm, even more preferably at least 6 N/25 mm, still more preferably at least 7 N/25 mm, yet more preferably at least 9 N/25 mm, yet more preferably at least 12 N/25 mm, yet more preferably at least 15 N/25 mm and most preferably at least 20 N/25 mm. In accordance with the present invention, the seal strength is measures as defined in ASTM F88-F88M. For instance, the seal strength may be determining by using an Instron 3365 tensile machine. Each tail of the specimen of the film-based article is secured in the opposing grips of the tensile machine and the seal remains unsupported during testing. Then a rate of grip separation of 500 mm/min may be used, wherein the force is measured by a load-cell on top of the Instron 3365 tensile machine and the results are reported in Newton/25 mm.

Due to the high seal strength obtainable with the method in accordance with the present invention, the method does not require the use of a glue or of an adhesive coating. Therefore, preferably the method in accordance with the present invention is performed without using a glue and without using an adhesive coating.

Moreover, it is preferred that the method in accordance with the present invention does not comprise any corona discharge treatment.

A further aspect of the present invention is an article comprising a rubber-like film-based article of which at least a portion is firmly fixed to a substrate, which is obtainable with the aforementioned method.

In a further development of the idea of the present invention it is preferred that the film-based article has at least one of the following properties, namely i) a tensile strength of at least 19 MPa, ii) a 10% Young's modulus of less than 0.25 MPa and iii) a complex modulus at 120° C. of at least $5.6 \times 10^5$ Pa·s, and that the seal strength of the heat sealed contact area between the film-based article and the substrate is at least 5 N/25 mm, preferably at least 5 N/25 mm, more preferably at least 6 N/25 mm, even more preferably at least 7 N/25 mm, still more preferably at least 9 N/25 mm, yet more preferably at least 12 N/25 mm, yet more preferably at least 15 N/25 mm and most preferably at least 20 N/25 mm. More preferably, the film-based article provided in step a) has at least two of the aforementioned properties i), ii) and iii) and most preferably the film-based article provided in step a) has all three properties i), ii) and iii). The tensile strength is preferably measured according to ASTM D412. The Young's modulus in Pa is calculated by the equation E=tensile stress/tensile strain=(F*L)/(A*ΔL), wherein F is the applied force, L is the initial length, A is the cross-sectional area and ΔL is the change in length. The tensile properties mentioned in this equation are measured according to ASTM D412. The complex modulus determined in accordance with ISO 6721-4:2019.

The article according to the present invention may comprise as rubber-like film-based article a surgical glove and as substrate a surgical coat or the arm portion of a surgical coat, wherein the contact area between the surgical glove and the surgical coat is preferably in the terminal end portion being opposite to the finger portion of the glove and at an appropriate position of the surgical coat so that it fits to a person wearing it.

In an alternative embodiment of the present invention, the article comprises as film-based article as well as as substrate are rubber-like film-based articles, wherein the substrate and the film-based article independently from each other are selected from the group consisting of gloves, customized clothes, articles of the pleasure industry, shoe soles and arbitrary combinations of two or more of the aforementioned forms.

In still an alternative embodiment of the present invention, the article comprises as rubber-like film-based article a catheter balloon and as substrate a catheter tube made of a thermoplastic polymer and preferably of thermoplastic polyurethane.

In yet an alternative embodiment of the present invention, the article comprises as substrate a breathable film for wound dressing, a sleeve for rubber gloves or a rubberlike seal for protective suits.

As set out above, according to the present invention it is possible and actually preferred that the film-based article and the substrate are not fixed to each other by means of a glue or an adhesive coating.

Subsequently, the present invention is illustrated by means of non-limiting examples.

Examples 1 to 3

Films made of a non-crosslinked thermoplastic rubber were prepared by coagulation dipping using as latex Cariflex IR2GL1 distributed by Cariflex Pte. Ltd. having been diluted to a solid content of 35% by weight, which is a latex of a block copolymer falling under the general formula (I), comprising the following steps A mold or former, respectively, was cleaned and dried at 100° C., the former was dipped in a coagulant solution, namely an aqueous solution comprising 15% by weight of calcium nitrate, the former was removed from the solution and dried at 100° C., the former was dipped in the aforementioned latex, the former with the latex film formed thereon was removed from the latex and pre-cured for 1 minute at 100° C., the latex film on the former was leached in water having a temperature of 50° C. for 5 minutes, the film on the former was cured in an oven at 120° C. for 20 minutes, the former with the film formed was cooled down to ambient temperature and then the film was removed from the former.

The so obtained film of non-crosslinked thermoplastic rubber was then cut into strips of 25 mm width and had a thickness of 0.30 mm.

The aforementioned method was repeated so as to obtain films of non-crosslinked thermoplastic rubber with a width of 25 mm and with a thickness of 0.22 mm and 0.43 mm, respectively.

In example 1, strips with a thickness of 0.22 mm were sealed together, in example 2 strips with a thickness of 0.30 mm and in example 3 strips with a thickness of 0.43 mm. The strips were laid above each other and sealed together along a line of the contact area having a width of 2 to 3 mm and a length of 25 mm with a Rajasystem, which was manually operated, wherein hand pressure was applied to the heat sealer. The off-line measured temperature during sealing was 190 to 220° C.

Afterwards, the seal strength of the heat sealed contact area was measured by using an Instron 3365 tensile machine. Each tail of the specimen of the heat sealed film laminated was secured in the opposing grips of the tensile machine and the seal remains unsupported during testing. Then a rate of grip separation of 500 mm/min was used, wherein the force was measured by a load-cell on top of the Instron 3365 tensile machine and the results were recorded in Newton/25 mm. Moreover, it was noted and recorded, where the break started, i.e. in one of the two films or in the seal area.

The following results were obtained:

TABLE 1

Results

| Example | Film thickness (mm) | Seal strength (N/25 mm) | Break in |
|---|---|---|---|
| 1 | 0.22 | 31 | film |
| 2 | 0.30 | 28 | seal |
| 3 | 0.43 | 10 | film |

Examples 4 to 11

Strips of a film of non-crosslinked thermoplastic rubber having a width of 25 mm and a thickness of 0.30 mm as described for examples 1 to 3 were heat sealed under conditions as described above for examples 1 to 3 to substrates made of other materials. These were film strips made of polyurethane distributed by Huntsman as PU Irogran® with the product codes 1778E4506 (example 4), A85E4993 (example 5), A85E4994 (example 6), A92E5670 (example 7), made of polyurethane distributed by Gerlinger industries (example 8), made of nylon (example 9), made of polyester (example 10) and made of polyethylene (example 11).

The following results were obtained:

TABLE 2

Results

| Example | Seal strength (N/25 mm) | Break in |
|---|---|---|
| 4 | 4.2 | seal |
| 5 | 4.5 | seal |
| 6 | 4.8 | seal |
| 7 | 4.3 | seal |
| 8 | 4.3 | seal |
| 9 | 6.3 | seal |
| 10 | 5.3 | seal |
| 11 | 6.2 | seal |

COMPARATIVE EXAMPLE

Example 1 was repeated except that the strip of film formed of Cariflex IR2GL1 was not heat sealed to another strip of the same film, but to a strip made of isoprene rubber latex Cariflex IR0401.

No heat seal could be achieved.

The invention claimed is:

1. A method of producing an article comprising a film-based article of which at least a portion is firmly fixed to a substrate, comprising:
   a) providing a film-based article made of a non-crosslinked thermoplastic rubber;
   b) contacting at least a portion of the film-based article with a substrate so as to form a contact area between the film-based article and the substrate; and
   c) heat sealing at least a portion of the contact area at a temperature of 190 to 250° C. for at least 1 second, wherein at least a portion of the film-based article is firmly fixed to the substrate without using a glue, an adhesive coating, or a corona discharge treatment.

2. The method according to claim 1, wherein the non-crosslinked thermoplastic rubber is a thermoplastic styrenic block copolymer, which is selected from the group consisting of styrene-isoprene-styrene block copolymers (SIS), styrene-isobutylene-styrene block copolymers (SIBS), styrene-butadiene-styrene block copolymers (SBS), styrene-ethylene-butylene-styrene block copolymers (SEBS), styrene-ethylene-propylene-styrene block copolymers (SEPS), styrene-ethylene-ethylene-propylene-styrene block copolymers (SEEPS) and arbitrary combinations of two or more of the aforementioned thermoplastic styrenic block copolymers.

3. The method according to claim 1, wherein the non-crosslinked thermoplastic rubber is a block copolymer of the general formula (I):

$$A\text{-}B\text{-}Y\text{-}(B\text{-}A)_n \qquad (I),$$

wherein
   each A is independently a polymer block composed of at least 90 mol. % of an alkenyl aromatic hydrocarbon,
   the content of A by weight of the total weight of the polymer is in the range of 9 to 12%,
   Y is the remnant of a coupling agent having a functionality greater than 2,
   the degree of branching is n+1, wherein n is an integer from 2 to 4,
   each B is independently an olefinically unsaturated polymer block composed of at least 90 mol. % of one or more conjugated dienes,
   the block copolymer has a coupling efficiency in the range of 84 to 100%,
   each A block independently has a weight average molecular weight ranging from 10,000 to 12,000 g/mol, and
   each B Block independently has a weight average molecular weight ranging from 80,000 to 120,000 g/mol, wherein the molecular weights are determined pursuant to ASTM 3536 using mono-dispersed polystyrene standards.

4. The method according to claim 3, wherein in the formula (I) each B is a polymer block composed of at least 90 mol. % of isoprene and each A is a polymer block composed of at least 90 mol. % of styrene.

5. The method according to claim 1, wherein the film of the film-based article provided in step a) has a thickness of 1 μm to 10 mm.

6. The method according to claim 1, wherein the film-based article provided in step a) has been prepared by coagulation dipping using a latex of the non-crosslinked thermoplastic rubber, wherein the coagulation dipping comprises:
   i) dipping a mold into a coagulant solution;
   ii) removing the mold from the coagulant solution and drying the mold;
   iii) dipping the dried mold into a latex of the non-crosslinked thermoplastic rubber so as to form a film-based article made of a non-crosslinked thermoplastic rubber on the mold;
   iv) removing the mold from the latex and pre-curing the latex with the film-based article;
   v) optionally leaching the film-based article in water;
   vi) curing the film-based article; and
   vii) removing the film-based article from the mold.

7. The method according to claim 1, wherein the substrate is made of a material being selected from the group consisting of non-crosslinked thermoplastic rubbers, polyamides, polyesters, thermoplastic polyurethanes and arbitrary combinations of two or more of the aforementioned materials.

8. The method according to claim 1, wherein the substrate is a fabric.

9. The method according to claim 1, wherein the heat sealing is performed at a temperature of 190 to 250° C. for at least 10 seconds.

10. The method according to claim 1, wherein the seal strength of the heat sealed contact area between the film-based article and the substrate is at least 5 N/25 mm.

* * * * *